(12) United States Patent
Goberti et al.

(10) Patent No.: US 8,071,686 B2
(45) Date of Patent: Dec. 6, 2011

(54) POLYOLEFIN COMPOSITIONS HAVING LOW HARDNESS AND LOW GLOSS

(75) Inventors: Paolo Goberti, Vigarano Mainarda (IT); Giampaolo Pellegatti, Boara (IT); Letizia Baraldi, S. Bartolomeo in Bosco (IT)

(73) Assignee: Basell Poliolefine Italia s.r.l., Milan (IT)

( * ) Notice: Subject to any disclaimer, the term of this patent is extended or adjusted under 35 U.S.C. 154(b) by 203 days.

(21) Appl. No.: 12/448,054

(22) PCT Filed: Oct. 24, 2007

(86) PCT No.: PCT/EP2007/061384
§ 371 (c)(1),
(2), (4) Date: Jun. 5, 2009

(87) PCT Pub. No.: WO2008/068113
PCT Pub. Date: Jun. 12, 2008

(65) Prior Publication Data
US 2010/0063207 A1    Mar. 11, 2010

Related U.S. Application Data

(60) Provisional application No. 60/874,563, filed on Dec. 13, 2006.

(30) Foreign Application Priority Data

Dec. 7, 2006  (EP) ..................... 06125609

(51) Int. Cl.
*C08L 9/00* (2006.01)
*C08L 23/04* (2006.01)
*C08L 23/10* (2006.01)
*C08L 23/12* (2006.01)

(52) U.S. Cl. .................... 525/232; 525/240; 525/242

(58) Field of Classification Search .................... 525/88, 525/89, 232, 240, 242
See application file for complete search history.

(56) References Cited

U.S. PATENT DOCUMENTS

| | | |
|---|---|---|
| 4,399,054 A | 8/1983 | Ferraris et al. |
| 5,055,438 A | 10/1991 | Canich |
| 5,095,153 A | 3/1992 | Agnes et al. |
| 5,145,819 A | 9/1992 | Winter et al. |
| 5,221,651 A | 6/1993 | Sacchetti et al. |
| 5,286,564 A | 2/1994 | Cecchin et al. |
| 5,302,454 A | 4/1994 | Cecchin et al. |
| 5,324,800 A | 6/1994 | Welborn, Jr. et al. |
| 5,360,868 A | 11/1994 | Mosier et al. |
| 5,703,187 A | 12/1997 | Timmers |
| 6,013,819 A | 1/2000 | Stevens et al. |
| 6,075,077 A | 6/2000 | Timmers et al. |
| RE37,384 E | 9/2001 | Winter et al. |
| 6,686,488 B2 | 2/2004 | Wilson et al. |
| 6,806,326 B2 | 10/2004 | Stevens et al. |
| 6,858,557 B1 | 2/2005 | Stevens |
| 6,884,857 B1 | 4/2005 | Stevens et al. |
| 7,022,640 B2 | 4/2006 | Morini et al. |
| 7,049,377 B1 | 5/2006 | Morini et al. |
| 7,205,364 B1 | 4/2007 | Canich |
| 7,288,598 B2 | 10/2007 | Pelliconi et al. |
| 7,294,674 B2 | 11/2007 | Pelliconi et al. |
| 7,592,393 B2 | 9/2009 | Pelliconi et al. |
| 7,592,396 B2 | 9/2009 | Pelliconi et al. |
| 7,728,077 B2 * | 6/2010 | Pelliconi et al. .............. 525/191 |
| 2007/0232765 A1 | 10/2007 | Pelliconi et al. |
| 2009/0047456 A1 | 2/2009 | Rigosi |
| 2009/0156748 A1 * | 6/2009 | Pellegatti et al. ............. 525/232 |
| 2009/0171018 A1 * | 7/2009 | Pellegatti et al. ............... 525/53 |

FOREIGN PATENT DOCUMENTS

| | | |
|---|---|---|
| EP | 45977 | 2/1982 |
| EP | 129368 | 12/1984 |
| EP | 361493 | 4/1990 |
| EP | 395083 | 10/1990 |
| EP | 400333 | 12/1990 |
| EP | 416815 | 3/1991 |
| EP | 420436 | 4/1991 |
| EP | 472946 | 3/1992 |
| EP | 485823 | 5/1992 |
| EP | 643066 | 3/1995 |
| EP | 671404 | 9/1995 |
| EP | 728769 | 8/1996 |
| EP | 1279699 | 1/2003 |
| WO | 91/04257 | 4/1991 |
| WO | 03/076508 | 9/2003 |
| WO | 03/076511 | 9/2003 |
| WO | 2005/103140 | 11/2005 |
| WO | 2007/096209 | 8/2007 |
| WO | 2008/068112 | 6/2008 |

OTHER PUBLICATIONS

US 5,168,111, 12/1992, Canich (withdrawn)

* cited by examiner

*Primary Examiner* — Jeffrey Mullis
(74) *Attorney, Agent, or Firm* — Dilworth IP, LLC

(57) ABSTRACT

A polyolefin composition comprising, in percent by weight: A) 10-25% of a propylene homopolymer or copolymer with up to 8% of comonomer(s); B) 75-90% of a copolymer of ethylene and (i) propylene or (ii) $CH_2=CHR$ alpha-olefins, where R is a 2-8 carbon alkyl radical, or (iii) a combination thereof, optionally with minor amounts of a diene, containing from 54 to 65% of ethylene; wherein the weight ratio B/XS of the content B of copolymer component (B) to the fraction XS soluble in xylene at room temperature, both referred to the total weight of (A)+(B), is of 1.50 or less.

8 Claims, No Drawings

POLYOLEFIN COMPOSITIONS HAVING LOW HARDNESS AND LOW GLOSS

The present invention concerns polyolefin compositions with low hardness and low gloss and the process for their preparation.

It is known that one can obtain polyolefin compositions having elastic properties while maintaining a good thermoplastic behavior (i.e., that can be transformed into finished products with the same techniques used for thermoplastic polymers), by way of sequential polymerization of propylene, optionally containing minor quantities of olefin comonomers, and then ethylene/propylene or ethylene/alpha-olefin mixtures.

Catalysts based on halogenated titanium compounds supported on magnesium chloride are used for this purpose.

Given the increasing practical interest for this type of compositions, due, among other things, to the valued properties which are typical of polyolefins (such as chemical inertia, mechanical properties and nontoxicity), there is an increasing effort in the art to extend the use of said compositions to many different fields.

European published patent application 400333 describes elastoplastic polyolefin compositions obtained by sequential polymerization comprising:
A) 10-60 parts by weight of a crystalline polymer or copolymer of propylene;
B) 10-40 parts by weight of a polymer fraction containing ethylene, insoluble in xylene at room temperature;
C) 30-60 parts by weight of an ethylene/propylene copolymer fraction, soluble in xylene at room temperature and containing 40-60% by weight of ethylene.

Said compositions are flexible and have valued elastic properties, as demonstrated by low flexural modulus values (less than 700 MPa, and, typically, higher than 200 MPa) associated to good tension set values, but do not have particularly good hardness values and optical characteristics, in particular as regards the gloss values which, on the other hand, for uses such as sheet extrusion, thermoforming, automotive skin layers, blow moulding, films, should be preferably comprised between 10 and 40, measured on extruded sheets, associated to flexural modulus values of 200 Mpa or less and to low values of hardness (Shore).

On the other hand, in European published patent application 472946 it is shown that by lowering the ethylene content of the xylene-soluble fraction C), and consequently of the overall ethylene/propylene elastomeric copolymer fraction, it is possible to achieve an improved balance of flexural modulus and hardness. However, also in this case the gloss values are too high, as will be shown in the examples.

Therefore, there is a need for elastoplastic polyolefin compositions which are flexible (i.e., with relatively low flexural modulus values), soft (i.e., with relatively low hardness values) and having also low values of gloss.

In response to such need, this invention provides a polyolefin composition comprising, in percent by weight (all percent amounts being by weight):
A) 10-25%, preferably 15-25%, of a propylene homopolymer or of a copolymer of propylene with one or more comonomer(s) selected from ethylene and $CH_2=CHR$ alpha-olefins where R is a 2-8 carbon alkyl, which copolymer contains up to 8% of comonomer(s), or a combination of said polymers;
B) 75-90%, preferably 75-85%, of a copolymer of ethylene and (i) propylene or (ii) $CH_2=CHR$ alpha-olefins, where R is a 2-8 carbon alkyl radical, or (iii) a combination thereof, optionally with minor amounts of a diene, containing from 54 to 65%, preferably from 55 to 63% of ethylene;
wherein the weight ratio B/XS of the content B of copolymer component (B) to the fraction XS soluble in xylene at room temperature (about 25° C.), both referred to the total weight of (A)+(B), is of 1.50 or less, preferably 1.40 or less, in particular from 1.50 to 0.9, or from 1.40 to 0.9.

The total quantity of copolymerized ethylene is preferably from 30% to 65% by weight, more preferably from 30% to 60% by weight, in particular from 30% to 55% by weight.

Other preferred features for the compositions of the present invention are:
Gloss values equal to or lower than 15%, more preferably equal to or lower than 10%, in particular equal to or lower than 7%;
Shore A values equal to or lower than 90, more preferably equal to or lower than 85;
Shore D values equal to or lower than 35, in particular from 35 to 15;
MFR values, measured according to ASTM-D 1238, condition L (230° C., with 2.16 kg load) of from 0.01 to 10 g/10 min., more preferably from 0.05 to 5 g/10 min.;
MFR values of component (A), measured according to ASTM-D 1238, condition L, equal to or higher than 2 g/10 min., more preferably equal to or higher than 3 g/10 min.;
Flexural Modulus equal to or lower than 200 MPa;
Stress at break: 2-13 MPa;
elongation at break: higher than 200%;
substantially no whitening (blush) when bending a plaque 1 mm thick;
amount of fraction soluble in xylene at room temperature (XS) of from 40 to 70% by weight, more preferably from 45 to 65% by weight, referred to the total weight of (A)+(B);
weight ratio $XS/C_2$ of the fraction XS soluble in xylene at room temperature to the total ethylene content $C_2$, both referred to the total weight of (A)+(B), is of 1.15 or more, more preferably 1.20 or more, in particular from 1.15 to 1.50 or from 1.20 to 1.50;
intrinsic viscosity [η] of the XS fraction of less than 3 dl/g, in particular from 2.9 to 1.5 dl/g;
isotacticity index (II) of component (A) equal to or higher than 90%, more preferably equal to or higher than 95%.

The polymerization process for the preparation of the compositions of the present invention may be carried out in a continuous or batch manner, following known techniques, operating in liquid phase, in the presence or not of an inert diluent, or in a gaseous phase, or with mixed liquid-gas techniques.

Polymerization times and temperatures are not critical and are advantageously in the range from 0.5 to 5 hrs, and from 50° C. to 90° C. respectively.

Propylene polymerization to form component (A) can be done in the presence of ethylene or $CH_2=CHR$ alpha-olefin(s) where R is a 2-8 carbon alkyl, such as for example butene-1, pentene-1,4-methylpentene-1, hexene-1 and octene-1, or combinations thereof.

The copolymerization of ethylene and propylene or other alpha-olefin(s), examples of which are given above for component (A), or combinations thereof, to form component (B) can occur in the presence of a diene, conjugated or not, such as butadiene, 1,4-hexadiene, 1,5-hexadiene and ethylidene-norbornene-1.

The diene when present, is typically in an amount of from 0.5 to 10% by weight with respect to the weight of (B).

In particular the compositions can be prepared with a sequential polymerization process carried out in at least two stages, one or more for the synthesis of the component (A), the other(s) for the synthesis of component (B). The polymerization in the subsequent stages occurs in the presence of the polymer obtained and the catalyst used in the preceding stage(s). Regulation of the molecular weight is done by using molecular weight regulators commonly used, e.g. hydrogen and $ZnEt_2$.

High values of MFR can be obtained directly in polymerization or by successive degradation of the polymer (generally carried out by chemical visbreaking)

The chemical visbreaking of the polymer is carried out in the presence of free radical initiators, such as the peroxides. Examples of radical initiators that can be used for this purpose are the 2,5-dimethyl-2,5-di (tert-butylperoxide)-hexane and dicumyl-peroxide.

The visbreaking treatment is carried out by using the appropriate quantities of free radical initiators, and preferably takes place in an inert atmosphere, such as nitrogen. Methods, apparatus, and operating conditions known in the art can be used to carry out this process.

As an effect of the degradation process, the intrinsic viscosity [η] value of the previously defined XS fraction of the polymer compositions of the present invention is decreased. Particularly preferred are the polymer compositions having viscosity [η] of the XS fraction of less than 3 dl/g, in particular from 2.9 to 1.5 dl/g, obtained by subjecting to degradation a precursor composition comprising the same components (A) and (B) in the same proportions (namely the above said components and proportions), but having viscosity [η] of the XS fraction of 3 dl/g or more.

However, also the polymer compositions having viscosity [η] of the XS fraction of 3 dl/g or more, in particular of from 3 to 4 dl/g, are within the scope of the present invention.

As already mentioned, the polymerization can occur in liquid phase, gas phase or liquid-gas phase.

For example, it is possible to prepare component (A) in a polymerization stage using liquid propylene as diluent, and component (B) in the following copolymerization stage in gas phase, without intermediate stages except for the partial degassing of the propylene. Preferably, both components (A) and (B) are prepared by operating the polymerization in gas phase. The order in which the components are prepared is not critical.

The reaction temperature in the polymerization stage(s) for the preparation of component (A) and in the one(s) for the preparation of component (B) can be the same or different, and is usually from 40° C. to 90° C., preferably 50-80° C. for the preparation of component (A), and 40-70° C. for the preparation of component (B).

The pressure of a single stage, if carried out in liquid monomer, is the one which competes with the vapor pressure of the liquid propylene at the operating temperature used, and is modified by the overpressure of the monomer(s) and the hydrogen used as molecular weight regulator, and possibly by the vapor pressure of the small quantity of inert diluent used to feed the catalyst mixture.

The polymerization pressure, if done in liquid phase, indicatively can be from 5 to 30 atm. The residence times relative to the two or more stages depend on the desired ratio between component (A) and (B), and are usually from 15 min. to 8 hours.

The said polymerization processes are generally carried out in the presence of stereospecific Ziegler-Natta catalysts supported on magnesium dihalides.

The said stereospecific catalysts used in the polymerization comprise the product of the reaction between:
1) a solid component, containing a titanium compound and an electron-donor compound (internal electron-donor) supported on magnesium dihalide (preferably chloride);
2) an aluminum alkyl compound (cocatalyst); and, optionally,
3) an electron-donor compound (external electron-donor).

Said catalysts are preferably capable of producing homopolymer polypropylene having an isotactic index higher than 90%.

The solid catalyst component (1) contains as electron-donor a compound generally selected among the ethers, ketones, lactones, compounds containing N, P and/or S atoms, and mono- and dicarboxylic acid esters.

Catalysts having the above mentioned characteristics are well known in the patent literature; particularly advantageous are the catalysts described in U.S. Pat. No. 4,399,054 and European patent 45977.

Particularly suited among the said electron-donor compounds are phthalic acid esters and succinic acid esters.

Suitable succinic acid esters are represented by the formula (I):

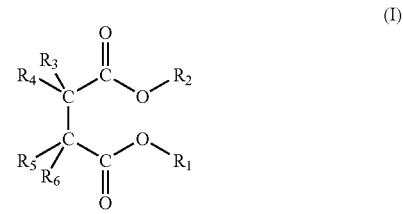

wherein the radicals $R_1$ and $R_2$, equal to or different from each other, are a C1-C20 linear or branched alkyl, alkenyl, cycloalkyl, aryl, arylalkyl or alkylaryl group, optionally containing heteroatoms; the radicals $R_3$ to $R_6$ equal to or different from each other, are hydrogen or a C1-C20 linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

$R_1$ and $R_2$ are preferably C1-C8 alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Another preferred group of compounds within those of formula (I) is that in which at least two radicals from $R_3$ to $R_6$ are different from hydrogen and are selected from C1-C20 linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Furthermore, also the compounds in which at least two radicals different from hydrogen are linked to different carbon atoms, that is $R_3$ and $R_5$ or $R_4$ and $R_6$ are particularly preferred. Other electron-donors particularly suited are the 1,3-diethers, as illustrated in published European patent applications EP-A-361 493 and 728769.

As cocatalysts (2), one preferably uses the trialkyl aluminum compounds, such as Al-triethyl, Al-triisobutyl and Al-tri-n-butyl.

The electron-donor compounds (3) that can be used as external electron-donors (added to the Al-alkyl compound) comprise the aromatic acid esters (such as alkylic benzoates), heterocyclic compounds (such as the 2,2,6,6-tetramethylpiperidine and the 2,6-diisopropylpiperidine), and in particular silicon compounds containing at least one Si—OR bond (where R is a hydrocarbon radical). The previously said 1,3-diethers are also suitable to be used as external donors. In the case that the internal donor is one of the said 1,3-diethers, the external donor can be omitted.

The catalysts may be precontacted with small quantities of olefin (prepolymerization), maintaining the catalyst in suspension in a hydrocarbon solvent, and polymerizing at temperatures from room to 60° C., thus producing a quantity of polymer from 0.5 to 3 times the weight of the catalyst.

The operation can also take place in liquid monomer, producing, in this case, a quantity of polymer up to 1000 times the weight of the catalyst.

Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257. These metallocene compounds may be used in particular to produce the component (B).

The compositions of the present invention can also contain additives, fillers and pigments commonly used for olefin polymers, such as, for example, nucleating agents, extension oils, mineral fillers, organic and inorganic pigments.

The polyolefin compositions of the present invention find application particularly in the extrusion, blow moulding, injection moulding and thermoforming fields, for production of various articles, like sheets, films and car parts.

The practice and advantages of the present invention are disclosed below in the following examples. These Examples are illustrative only, and are not intended to limit the allowable scope of the invention in any manner whatsoever.

The following analytical methods are used to characterize the polymer compositions.

Melt Flow Rate: ASTM-D 1238, condition L (230° C., 2.16 kg).

[η] intrinsic viscosity: determined in tetrahydronaphtalene at 135° C.

Ethylene content: I.R. Spectroscopy.

Gloss: method ASTM D 523 (1 mm extruded sheet)

Shore A and D: ISO 868 (4 mm thick compression moulded plaque)

Flexural Modulus: ISO 178 (4 mm thick compression moulded plaque)

Stress at Break: ISO 527 (1 mm extruded sheet)

Elongation at Break: ISO 527 (1 mm extruded sheet)

Xylene soluble and insoluble fractions 2.5 g of polymer and 250 cm³ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm³ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

EXAMPLES 1-2 AND COMPARATIVE EXAMPLE 1

The solid catalyst component used in polymerization is a highly stereospecific Ziegler-Natta catalyst component supported on magnesium chloride, containing about 2.2% by weight of titanium and diisobutylphthalate as internal donor, prepared by analogy with the method described in Example 3 of European published patent application 395083.

Catalyst System and Prepolymerization Treatment

Before introducing it into the polymerization reactors, the solid catalyst component described above is contacted at −5° C. for 5 minutes with aluminum triethyl (TEAL) and dicyclopentyldimethoxysilane (DCPMS), in a TEAL/DCPMS weight ratio equal to about 5 and in such quantity that the TEAL/solid catalyst component weight ratio be equal to 5.

The catalyst system is then subjected to prepolymerization by maintaining it in suspension in liquid propylene at 25° C. for about 30 minutes before introducing it into the first polymerization reactor.

Polymerization

Into a first gas phase polymerization reactor a propylene polymer (component (A)) is produced by feeding in a continuous and constant flow the prepolymerized catalyst system, hydrogen (used as molecular weight regulator) and propylene (Example 1) or propylene and ethylene (Example 2) in the gas state.

The propylene polymer produced in the first reactor is discharged in a continuous flow and, after having been purged of unreacted monomers, is introduced, in a continuous flow, into a second gas phase polymerization reactor, together with quantitatively constant flows of hydrogen, ethylene and propylene in the gas state.

In the second reactor a propylene/ethylene copolymer (component (B)) is produced. Polymerization conditions, molar ratio of the reactants and composition of the polymers obtained are shown in Table 1.

The polymer particles exiting the second reactor are subjected to a steam treatment to remove the reactive monomers and volatile substances, and then dried.

The polymer particles are mixed with usual stabilisers in a twin screw extruder Berstorff ZE 25 (length/diameter ratio of screws: 33) and extruded under nitrogen atmosphere in the following conditions:

| Rotation speed: | 250 rpm; |
|---|---|
| Extruder output: | 6-20 kg/hour; |
| Melt temperature: | 200-250° C. |

The characteristics reported in Table 2, relating to the polymer compositions, are obtained from measurements carried out on the so extruded polymer.

The polymer compositions thus obtained are also subjected to extrusion/granulation in a Werner 58 twin screw extruder in the presence of Luperox™ 101 (2,5-dimethyl-2,5-bis(tert-butyl peroxy)hexane), in amounts of 0.015% by weight (Example 1) and 0.03% by weight (Example 2). The extrusion is carried out under nitrogen atmosphere in the following conditions:

| Rotation speed: | 200 rpm; |
|---|---|
| Extruder output: | 150 kg/hour; |
| Melt temperature: | about 240° C. |

The so obtained polymer properties are reported in Table 3.

For comparison purposes, Tables 2 and 3 report the properties of a polyolefin composition (Comparative Example 1C) prepared by sequential polymerization and comprising:

A) 31% by weight of a random copolymer of propylene with ethylene, containing about 3.5% by weight of ethylene;

B) 69% by weight of an elastomeric copolymer of propylene with ethylene, containing about 27% by weight of ethylene.

TABLE 1

| | | Example No. | |
|---|---|---|---|
| | | 1 | 2 |
| 1st Reactor | | | |
| Temperature | ° C. | 75 | 75 |
| Pressure | barg | 16 | 16 |
| H2/C3- | mol. | 0.025 | 0.006 |
| C2-/(C2- + C3-) | mol. | — | 0.022 |
| Split | wt % | 20 | 21 |
| C2- content (copolymer) | wt % | — | 2.5 |
| MFR | g/10' | 25 | 5.36 |
| 2nd Reactor | | | |
| Temperature | ° C. | 65 | 65 |
| Pressure | barg | 16 | 16 |
| H2/C2- | mol. | 0.0759 | 0.046 |
| C2-/(C2- + C3-) | mol. | 0.35 | 0.415 |
| Split | wt % | 80 | 79 |
| C2- content (copolymer) | wt % | 57 | 59 |

Notes:
C3- = propylene; C2- = ethylene; split = amount of polymer produced in the concerned reactor; C2- content (copolymer) = ethylene content with respect to the copolymer prepared in the concerned reactor.

TABLE 2

| | | Example No. | | |
|---|---|---|---|---|
| | | 1 | 2 | 1C |
| MFR L | g/10' | 0.24 | 0.1 | 0.6 |
| Xylene soluble | wt % | 63.2 | 62.95 | 64 |
| C2- content | wt % | 45.6 | 46.4 | 19.7 |
| X.S.I.V. | dl/g | 3.87 | 4.36 | 3.2 |

Notes:
X.S.I.V = Intrisic Viscosity of the fraction soluble in xylene; MD = Machine Direction; TD = Transverse Direction.

TABLE 3

| | | Example No. | | |
|---|---|---|---|---|
| | | 1 | 2 | 1C |
| MFR L | g/10' | 0.5 | 0.7 | 0.6 |
| Xylene soluble | wt % | 61 | 62.5 | 64 |
| X.S.I.V. | dl/g | 2.8 | 2.3 | 3.2 |
| Shore A | | 75 | 73 | >90 |
| Flexural Modulus | MPa | | | 80 |
| Stress at break MD/TD | MPa | 4.8/3.5 | 3.8/2.6 | 21.4/20.3 |
| Elongation at break MD/TD | % | 510/472 | 378/261 | 723/762 |
| Gloss | % | 4.9 | 4.5 | 73.5 |

The invention claimed is:

1. A polyolefin composition comprising, in percent by weight:
    A) 10-25% of a propylene homopolymer or a copolymer of propylene with at least one comonomer selected from ethylene and $CH_2=CHR$ alpha-olefins where R is a 2-8 carbon alkyl, the copolymer comprising up to 8% of the comonomer, or a combination of the propylene homopolymer and the copolymer of propylene;
    B) 75-90% of a copolymer of ethylene and (i) propylene or (ii) $CH_2=CHR$ alpha-olefins, where R is a 2-8 carbon alkyl radical, or (iii) a combination thereof, optionally with minor amounts of a diene, comprising from 54% to 65% of ethylene;
    wherein the weight ratio B/XS of the content B of copolymer component (B) to the fraction XS of the polyolefin composition which is soluble in xylene at room temperature, both B and XS being referred to the total weight of (A)+(B), is 1.40 or less, wherein the intrinsic viscosity [η] of the XS fraction is less than 3 dl/g, determined in tetrahydronaphthalene at 135° C.,
    and the polyolefin composition has a gloss value of at most 15% and a Shore A value of at most 90.

2. The polyolefin composition of claim 1, wherein the weight ratio $XS/C_2$ of the fraction XS to the total ethylene content $C_2$, both XS and $C_2$ being referred to the total weight of (A)+(B), is 1.15 or more.

3. The polyolefin composition of claim 1, wherein the polyolefin composition is obtained by subjecting a precursor composition comprising the same components (A) and (B) in the same proportions, but having viscosity [η] of the XS fraction of 3 dl/g or more to degradation.

4. The polyolefin composition of claim 1 comprising a MFR value of from 0.01 to 10 g/10 min., measured according to ASTM-D 1238, condition L (230° C., 2.16 kg).

5. The polyolefin composition of claim 1 comprising Flexural Modulus values equal to or lower than 120 MPa.

6. A polymerization process for preparing a polyolefin composition comprising, in percent by weight:
    A) 10-25% of a propylene homopolymer or a copolymer of propylene with at least one comonomer selected from ethylene and $CH_2=CHR$ alpha-olefins where R is a 2-8 carbon alkyl, the copolymer comprising up to 8% of the comonomer, or a combination of the propylene homopolymer and the copolymer of propylene;
    B) 75-90% of a copolymer of ethylene and (i) propylene or (ii) $CH_2=CHR$ alpha-olefins, where R is a 2-8 carbon alkyl radical, or (iii) a combination thereof, optionally with minor amounts of a diene, comprising from 54% to 65% of ethylene;
    wherein the weight ratio B/XS of the content B of copolymer component (B) to the fraction XS of the polyolefin composition which is soluble in xylene at room temperature, both B and XS being referred to the total weight of (A)+(B), is 1.40 or less, wherein the intrinsic viscosity [η] of the XS fraction is less than 3 dl/g, determined in tetrahydronaphthalene at 135° C.

and the polyolefin composition has a gloss value of at most 15% and a Shore A value of at most 90;

the process comprising at least two sequential stages, wherein components (A) and (B) are prepared in separate subsequent stages, operating in each stage, except the first stage, in presence of the polymer formed and catalyst used in the preceding stage.

7. Manufactured articles, comprising a polyolefin composition comprising, in percent by weight:

A) 10-25% of a propylene homopolymer or a copolymer of propylene with at least one comonomer selected from ethylene and $CH_2=CHR$ alpha-olefins where R is a 2-8 carbon alkyl, the copolymer comprising up to 8% of the comonomer, or a combination of the propylene homopolymer and the copolymer of propylene;

B) 75-90% of a copolymer of ethylene and (i) propylene or (ii) $CH_2=CHR$ alpha-olefins, where R is a 2-8 carbon alkyl radical, or (iii) a combination thereof, optionally with minor amounts of a diene, comprising from 54% to 65% of ethylene;

wherein the weight ratio B/XS of the content B of copolymer component (B) to the fraction XS of the polyolefin composition which is soluble in xylene at room temperature, both B and XS being referred to the total weight of (A)+(B), is 1.40 or less, wherein the intrinsic viscosity [η] of the XS fraction is less than 3 dl/g, determined in tetrahydronaphthalene at 135° C.

and the polyolefin composition has a gloss value of at most 15% and a Shore A value of at most 90;

the manufactured articles being prepared by extrusion or injection molding, and the manufactured articles being selected from sheets, films, and car parts.

8. The polyolefin composition of claim 1, further comprising a Flexural Modulus of equal to or lower 200 MPa.

* * * * *